(12) United States Patent
Liang

(10) Patent No.: US 7,549,758 B2
(45) Date of Patent: Jun. 23, 2009

(54) MAGIC MIRROR AND METHOD FOR MANUFACTURING A MAGIC MIRROR

(76) Inventor: Nai-Yueh Liang, 9F, No. 48, Alley 100, Lane 109, Sec. 2, Mujha Rd., Wunshan Dist., Taipei (TW)

( * ) Notice: Subject to any disclaimer, the term of this patent is extended or adjusted under 35 U.S.C. 154(b) by 271 days.

(21) Appl. No.: 11/610,644

(22) Filed: Dec. 14, 2006

(65) Prior Publication Data

US 2007/0139801 A1 Jun. 21, 2007

(30) Foreign Application Priority Data

Dec. 19, 2005 (TW) .............................. 94145014 A

(51) Int. Cl.
G02B 5/08 (2006.01)
B29C 65/00 (2006.01)
(52) U.S. Cl. .................. 359/838; 359/900; 156/196
(58) Field of Classification Search ........... 359/838, 359/900; 156/196, 212, 219
See application file for complete search history.

(56) References Cited

U.S. PATENT DOCUMENTS 4,353,858 A * 10/1982 Gilleo et al. ............... 264/268

2002/0006492 A1 * 1/2002 Morikawa et al. .......... 428/40.1

FOREIGN PATENT DOCUMENTS

| JP | 06-148411 | 5/1994 |
| JP | 07-213398 | 8/1995 |
| JP | 08-062408 | 3/1996 |
| JP | 08-266382 | 10/1996 |
| JP | 11-113701 | 4/1999 |
| JP | 2000-106994 | 4/2000 |

* cited by examiner

*Primary Examiner*—Alessandro Amari
(74) *Attorney, Agent, or Firm*—patenttm.us

(57) ABSTRACT

A method for manufacturing a magic mirror has a reflective surface forming step, a pattern preparing step and a solidifying step. The reflective surface forming step is forming a reflective surface on a mirror substrate. The pattern preparing step is attaching an adhesive to a rear surface of the mirror substrate opposite to the reflective surface. The solidifying step is solidifying and contracting the adhesive to deform parts of the reflective surface to finish a magic mirror. The method is simple and has a low cost.

20 Claims, 4 Drawing Sheets

US 7,549,758 B2

MAGIC MIRROR AND METHOD FOR MANUFACTURING A MAGIC MIRROR

BACKGROUND OF THE INVENTION

1. Field of the Invention

The present invention relates to a magic mirror, and more particularly to a magic mirror and a method for manufacturing a magic mirror that is simple and quick and has a low cost.

2. Description of Related Art

Magic mirrors derive from West Han Dynasty. An excavated bronze mirror in the West Han Dynasty has a front surface being a reflective surface and a rear surface including a pattern formed on the rear surface. When the reflective surface reflect light onto an object such as a wall or the ground to form a projected image, the projected image presents a same pattern as the pattern on the rear surface of the bronze mirror, as if the pattern on the bronze mirror directly project the image onto the object. Thus, savants call such a bronze mirror as a mirror pervious to light. Western people even call it a magic mirror.

A conventional method for manufacturing a magic mirror comprises steps of casting, pattern-forming and polishing. The casting step is casting a thin mirror body having a front surface and a rear surface. The pattern-forming step is forming an uneven relief pattern on the rear surface of the mirror substrate. An uneven extent of the relief pattern is high. The polishing step is polishing the front surface of the mirror substrate so that the front surface deforms to be uneven according to the uneven relief pattern on the rear surface to form a magic mirror. When light is reflected by the front surface of the magic mirror to be projected onto an object over a sufficient distance from the magic mirror, an enlarged projected image due to the sufficient distance is formed. The enlarged projected image clearly shows a pattern with light-and-shade effect according to the uneven relief pattern on the magic mirror. However, the conventional method with casting and polishing steps greatly consumes time and has a high cost.

U.S. Pat. No. 5,080,940 discloses an improved method for manufacturing a magic mirror being forming a pattern on a rear surface of a mirror substrate with a thickness of few millimeters by a laser sculpture manner. However, the laser equipment for implementing laser sculpture is very expensive.

To overcome the shortcomings, the present invention provides a magic mirror and a method for manufacturing a magic mirror to mitigate or obviate the aforementioned problems.

SUMMARY OF THE INVENTION

The main objective of the invention is to provide a magic mirror and a method for manufacturing a magic mirror that is simple and quick and has a low cost.

A method for manufacturing a magic mirror in accordance with the present invention comprises a reflective surface forming step, a pattern preparing step and a solidifying step.

The reflective surface forming step is forming a reflective surface on a mirror substrate. The pattern preparing step is attaching an adhesive to a rear surface of the mirror substrate opposite to the reflective surface. The solidifying step is solidifying and contracting the adhesive to deform parts of the reflective surface to finish a magic mirror.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
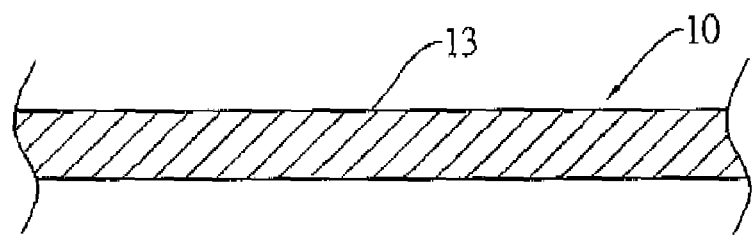
FIG. 1 is a top view of the semi-finished magic mirror corresponding to the reflective surface forming step of a first embodiment of a method for manufacturing a magic mirror in accordance with the present invention.
Figure 2:
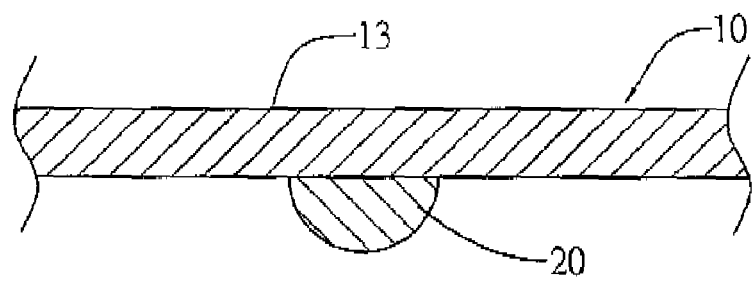
FIG. 2 is a top view of the semi-finished magic mirror corresponding to the pattern-forming step of the method in FIG. 1
Figure 3:
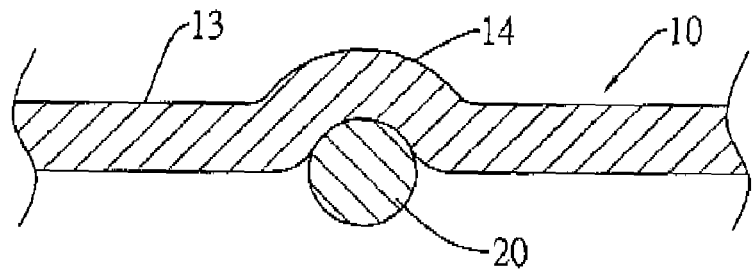
FIG. 3 is a top view of the finished magic mirror of the method in FIG. 2.

With reference to FIGS. 1 to 3, a method for manufacturing a magic mirror comprises a reflective surface forming step, a pattern preparing step and a solidifying step.

Figure 4:
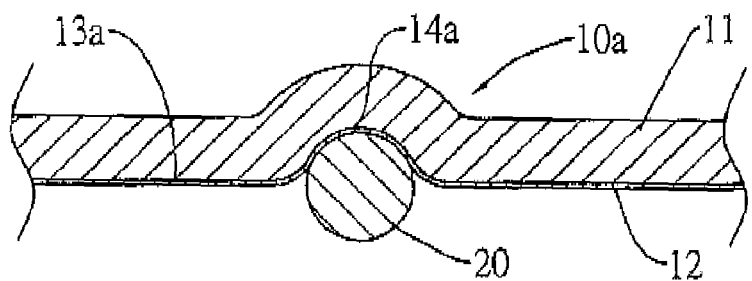
FIG. 4 is a top view of the finished magic mirror of a second embodiment of a method for manufacturing a magic mirror in accordance with the present invention.

The reflective surface forming step is forming a reflective surface (13, 13*a*) on a front surface of a mirror substrate (10, 10*a*) having the front surface, a rear surface opposite to the reflective surface and a thickness less than or equal to 3 millimeters. In a first embodiment of the method, the mirror substrate (10) is opaque and is made of plastic, sheet metal or steel, and the reflective surface (13) is formed on a front surface of the mirror substrate (10), as shown in FIG. 1. In a second embodiment of the method, the mirror substrate (10*a*) has a transparent substrate (11) and a reflective layer (12), as shown in FIG. 4. The transparent substrate (11) is made of transparent plastic, transparent glass or transparent quartz and has a front surface and a rear surface. The reflective layer (12) is attached to the rear surface of the transparent substrate (11) and has an inside surface and an outside surface. The inside surface of the reflective layer (12) is the reflective surface (13*a*) and is attached to the rear surface of the transparent substrate (11). The outside surface is the rear surface of the mirror substrate (10*a*).

With reference to FIG. 2, the patterning preparing step is drawing a pattern outline on the rear surface of the mirror substrate (10, 10*a*) opposite to the reflective surface (13, 13*a*) by attaching an adhesive (20) to the rear surface. In the second embodiment of the method, the adhesive (20) is attached to the outside surface of the reflective layer (12). The adhesive (20) has a volume and a contract rate of volume being positive or negative and is capable of changing the volume after solidifying. When the contract rate of volume is positive, the adhesive (20) contracts and becomes smaller after solidifying. When the contract rate of volume is negative, the adhesive (20) expands and becomes larger after solidifying. The adhesive (20) may be an ultraviolet (UV) adhesive capable of solidifying after receiving UV light, a thermal adhesive capable of solidifying after heated or a mixture of the UV and thermal adhesive.

With reference to FIGS. 3 and 4, the solidifying step is solidifying the adhesive (20) to change the volume of the adhesive (20) so that the adhesive (20) contracts or expands to form a pattern on the rear surface of the mirror substrate (10, 10a) and therefore finish a magic mirror. Parts of the reflective surface (13, 13a) of the mirror substrate (10, 10a) corresponding to the adhesive (20) deform and is curved due to the contract or expansion of the adhesive (20) so that each part generates a curvature variation (14, 14a) to form the pattern. Therefore, light reflected by the reflective surface (13, 13a) is projected onto an object such as a wall or the ground to form a projected image (30) with light-and-shade effect, which the same as the pattern. When the adhesive (20) contracts after solidifying, the curvature variations (14, 41a) are positive, which means the parts of the reflective surface (13, 13a) corresponding to the curvature variations (14, 14a) deform to be convex, as shown in FIGS. 3 and 4. When the adhesive (20) expands after solidifying, the curvature variations (14, 14a) are negative, which means the parts of the reflective surface (13, 13a) deform to be concave.

Figure 5:
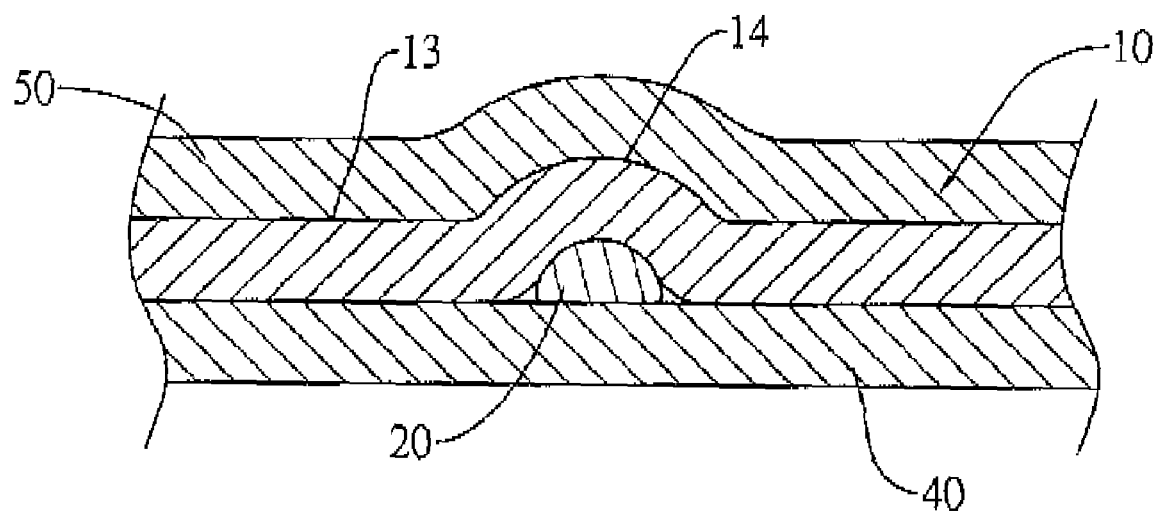
FIG. 5 is a top view of the finished magic mirror of a third embodiment of the method for manufacturing a magic mirror in accordance with the present invention.
Figure 6:
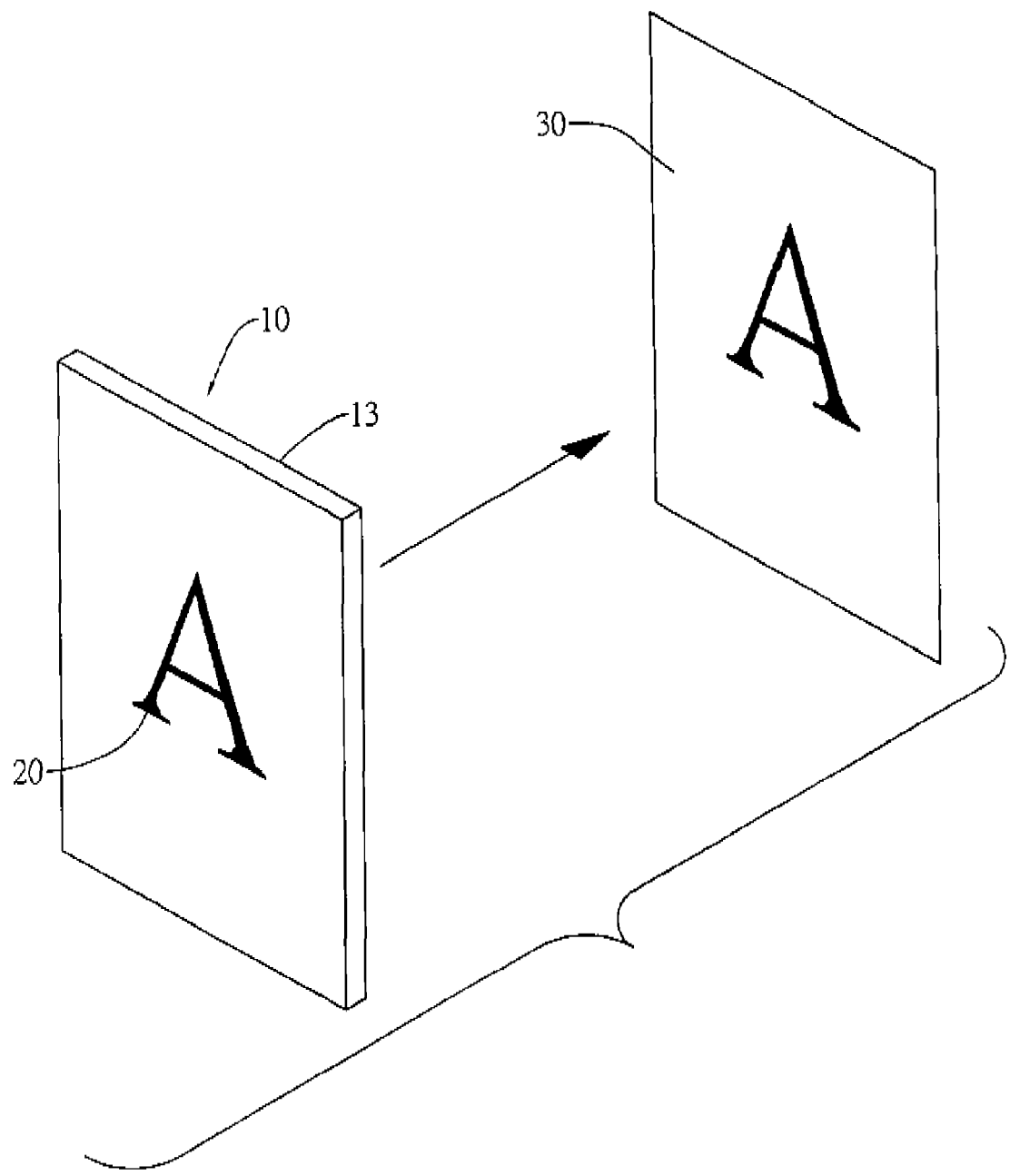
FIG. 6 is an operational perspective view of the magic mirror in FIGS. 3, 4 and 5 reflecting and projecting light to form a projected image on an object.

With reference to FIG. 5, a third embodiment of the method further comprises a reinforcing step after the solidifying step. The reinforcing step is mounting a reinforcing backplate (40) on the rear surface of the mirror substrate (10, 10a) and mounting a transparent reinforcing front plate (50) on the front surface of the mirror substrate (10, 10a). The backplate (40) and the transparent front plate (50) strengthen the magic mirror and prevent the pattern from being damaged.

Figure 7:
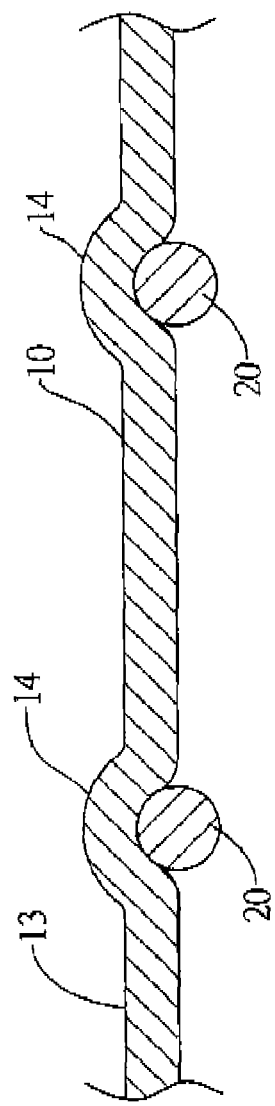
FIG. 7 is a top view of the magic mirror in FIG. 3.
Figure 8:
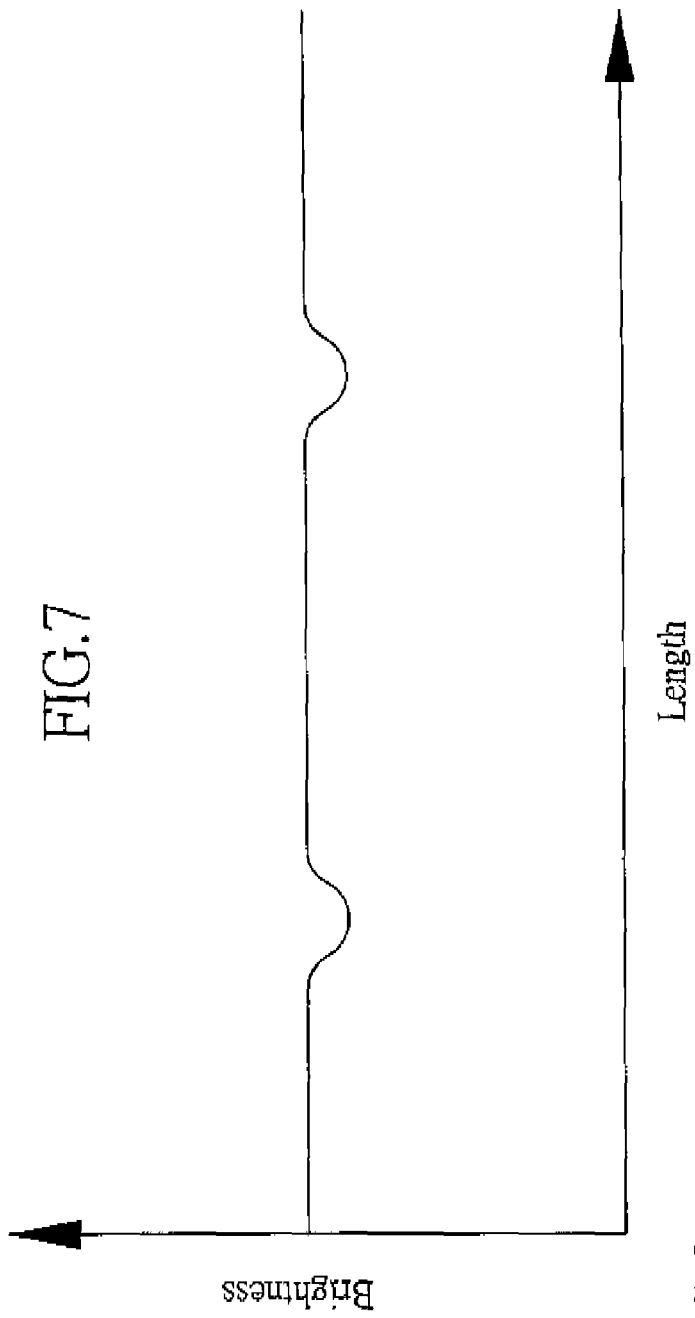
FIG. 8 is a diagram aligned with the magic mirror in FIG. 7 and showing a relationship of the brightness and length along the magic mirror.

With reference to FIGS. 7 and 8 aligned with each other, when the parts of the reflective surface (13, 13a) corresponding to the curvature variations (14, 14a) are convex, corresponding parts of the projected image (30) has a low brightness as compared with non-corresponding parts of the projected image (30). When the parts of the reflective surface (13, 13a) corresponding to the curvature variations (14, 14a) are concave, the corresponding parts of the projected image (30) has a high brightness as compared with non-corresponding parts.

The adhesive (20) is cheap. Furthermore, attaching the adhesive (20) onto the mirror substrate (10, 10a) is simple and quick. Therefore, the method for manufacturing the magic mirror implemented with the adhesive (20) saves time and has a low cost as compared with a conventional method for manufacturing the magic mirror implemented with casting and polishing or laser sculpture manners.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method for manufacturing a magic mirror comprising:
  a reflective surface forming step being forming a reflective surface on a front surface of a mirror substrate;
  a pattern preparing step being drawing a pattern outline on the rear surface of the mirror substrate opposite to the reflective surface by attaching an adhesive to the rear surface, wherein the adhesive has a volume and a contract rate of volume and is capable of changing the volume after solidifying; and
  a solidifying step being solidifying the adhesive to change the volume of the adhesive and deforming and curving parts of the reflective surface of the mirror substrate corresponding to the adhesive and making each part generate a curvature variation to form a pattern on the rear surface of the mirror substrate and finish a magic mirror.

2. The method as claimed in claim 1, wherein the contract rate of volume of the adhesive is positive.

3. The method as claimed in claim 2, wherein the contract rate of volume of the adhesive negative.

4. The method as claimed in claim 1, wherein a thickness of the mirror substrate is equal to or less than 3 millimeters.

5. The method as claimed in claim 4, wherein the mirror substrate is made of plastic.

6. The method as claimed in claim 4, wherein the mirror substrate has
  a transparent substrate made of plastic and having a rear surface; and
  a reflective layer attached to the rear surface of the transparent substrate and having
    an inside surface being the reflective surface and attached to the rear surface of the transparent; and
    an outside surface being the rear surface of the mirror substrate.

7. The method as claimed in claim 4, wherein the mirror substrate has
  a transparent substrate made of glass and having a rear surface; and
  a reflective layer attached to the rear surface of the transparent substrate and having
    an inside surface being the reflective surface and attached to the rear surface of the transparent; and
    an outside surface being the rear surface of the mirror substrate.

8. The method as claimed in claim 4, wherein the mirror is made of sheet metal.

9. The method as claimed in claim 4 further comprising a reinforcing step being mounting a reinforcing backplate on the rear surface of the mirror substrate.

10. A magic mirror comprising:
  a mirror substrate having
    a reflective surface and parts of the reflective surface deforming to make each part have a curvature variation; and
    a rear surface opposite to the reflective surface;
  an adhesive attached to the rear surface of the mirror substrate, solidified, corresponding to the parts of the reflective surface deforming and having a volume changing after solidified and a contract rate of volume.

11. The magic mirror as claimed in claim 10, wherein the contract of volume of the adhesive is positive.

12. The magic mirror as claimed in claim 11, wherein the mirror substrate has
  a transparent substrate made of glass and having a rear surface; and
  a reflective layer attached to the rear surface of the transparent substrate and having
    an inside surface being the reflective surface and attached to the rear surface of the transparent; and
    an outside surface being the rear surface of the mirror substrate.

13. The magic mirror as claimed in claim 10, wherein the contract of volume of the adhesive is negative.

14. The magic mirror as claimed in claim 10, wherein a thickness of the magic mirror is equal or less than 3 millimeters.

15. The magic mirror as claimed in claim 10, wherein the mirror substrate has a transparent substrate made of plastic and having a rear surface; and a reflective layer attached to the rear surface of the transparent substrate and having
- an inside surface being the reflective surface and attached to the rear surface of the transparent; and
- an outside surface being the rear surface of the mirror substrate.

16. The magic mirror as claimed in claim 10, wherein the mirror substrate is made of sheet metal.

17. The magic mirror as claimed in claim 10, wherein a reinforcing backplate is mounted on the rear of the mirror substrate.

18. The magic mirror as claimed in claim 10, wherein the adhesive is thermal adhesive.

19. The magic mirror as claimed in claim 10, wherein the adhesive is an ultraviolet adhesive.

20. The magic mirror as claimed in claim 10, wherein a transparent reinforcing front plate is mounted on the front surface of the mirror substrate.

* * * * *